United States Patent [19]

Caspari

[11] 4,020,484
[45] Apr. 26, 1977

[54] SEGMENTED CHARACTER GENERATOR FOR USE WITH A TELEVISION RECEIVER

[75] Inventor: Fred W. Caspari, South Bend, Ind.

[73] Assignee: The Magnavox Company, Fort Wayne, Ind.

[22] Filed: Dec. 8, 1975

[21] Appl. No.: 638,567

Related U.S. Application Data

[63] Continuation of Ser. No. 476,481, June 5, 1974, abandoned.

[52] U.S. Cl. .................. 340/324 AD; 178/DIG. 15; 340/336; 358/192
[51] Int. Cl.² .......................................... G06F 3/14
[58] Field of Search ........ 340/324 A, 324 AD, 336; 178/15, 30, DIG. 15, DIG. 23, 7.5 SE

[56] References Cited
UNITED STATES PATENTS

| | | | |
|---|---|---|---|
| 3,588,873 | 6/1971 | Osborne et al. | 340/324 A |
| 3,637,997 | 1/1972 | Peterson | 340/324 AD |
| 3,812,285 | 5/1974 | Miyata et al. | 340/324 A |

*Primary Examiner*—Marshall M. Curtis

*Attorney, Agent, or Firm*—Thomas Briody; William J. Streeter; George R. Pettit

[57] ABSTRACT

Apparatus and method for generating a size-controllable, segmented character for use with a television receiver. The character generator can be used to display the television channel number to which a television receiver is tuned. Associated apparatus is provided for endowing a displayed character with a cursive slant. The apparatus controlling the size of the displayed character can be set to cause the character to continuously diminish, after a predetermined time, eventually disappearing.

The character segments are defined by clocking apparatus related to the horizontal and vertical scan of a television display unit. In addition from horizontal and vertical clocks enabling all possible character segments, enabling signals are generated by the receiver apparatus specifying particular segments of a desired character.

3 Claims, 6 Drawing Figures

SEGMENTED CHARACTER GENERATOR FOR USE WITH A TELEVISION RECEIVER

This application is a continuation of Ser. No. 476,481, filed June 15, 1974, now abandoned.

BACKGROUND OF THE INVENTION

1. Field of the Invention

This invention relates to apparatus for displaying characters on a display unit of a television receiver and more particularly for apparatus for displaying a number designating a channel to which the receiver is tuned.

2. Description of Prior Art

It is known in the prior art to display a channel number indicating the frequency to which a television receiver is tuned on the mechanical switch providing course tuning of the television receiver or by having the mechanical switch controls separate display apparatus. The switch determining the channel to which the television receiver is currently tuned and the display, controlled by the switch position, automatically displays the channel number. More recently, apparatus has been provided to tune the television receiver electronically in order to eliminate the problems associated with mechanical apparatus. A portion of the electronic apparatus can be used to drive the external display apparatus. It would be more convenient to incorporate, to the extent possible, the display of the television channel in the electronic tuning apparatus.

It is also convenient to display the current channel on the television screen concurrently with tuning to that channel, or upon a request signalled to the receiver for identification of the channel to which the television receiver is currently tuned. Such an arrangement eliminates the need for a separate external display device. Furthermore, the display of the channel, whether upon tuning or upon interrogation of the receiver tuning, must be made temporary in order not to interfere with received channel information.

It is therefore an object of the present invention to provide an improved character generator for use with a television receiver display unit.

It is another object of the present invention to provide a television receiver character generator for use with a display unit having a plurality of segments.

It is a still further object of the present invention to provide a display of alpha/numeric characters on a television display unit having size control mechanism.

It is yet another object of the present invention to provide a character generator for use with a television display unit having size-controllable characters and a cursive slant.

It is a more particular object of the present invention to provide a character display apparatus for use with a television receiver display unit having horizontal and vertical clocking apparatus for determining the position of component segment of the displayed characters.

It is still a further object of the present invention to provide a mechanism for controlling the size of characters displayed on a television receiver in response to input signals.

It is yet still a further object of the present invention to provide characters which disappear from the display unit by continuously decreasing in size.

SUMMARY OF THE INVENTION

The aforementioned and other objects accomplished according to the present invention by apparatus generating a plurality of segments for use by a display apparatus of a television receiver, by apparatus for enabling segments related to stored input data, and by apparatus for controlling the size of the segments. The apparatus generating the available segments is provided by clocks related to the horizontal and to the vertical scanning of the display apparatus of the television receiver. The input apparatus, typically a television channel number is supplied to the enabling circuits and the enabling segments to control the output of the video signal.

Apparatus is provided which can produce a cursive slant to the characters.

Apparatus is also included with the size-control apparatus for having the character continuously diminish in size after a predetermined time rather than fading from the receiver display unit.

These and other features of the invention will be understood upon reading of the following description along with the drawings.

DESCRIPTION OF THE PREFERRED EMBODIMENT

Detailed Description of the Figures

Figure 1:
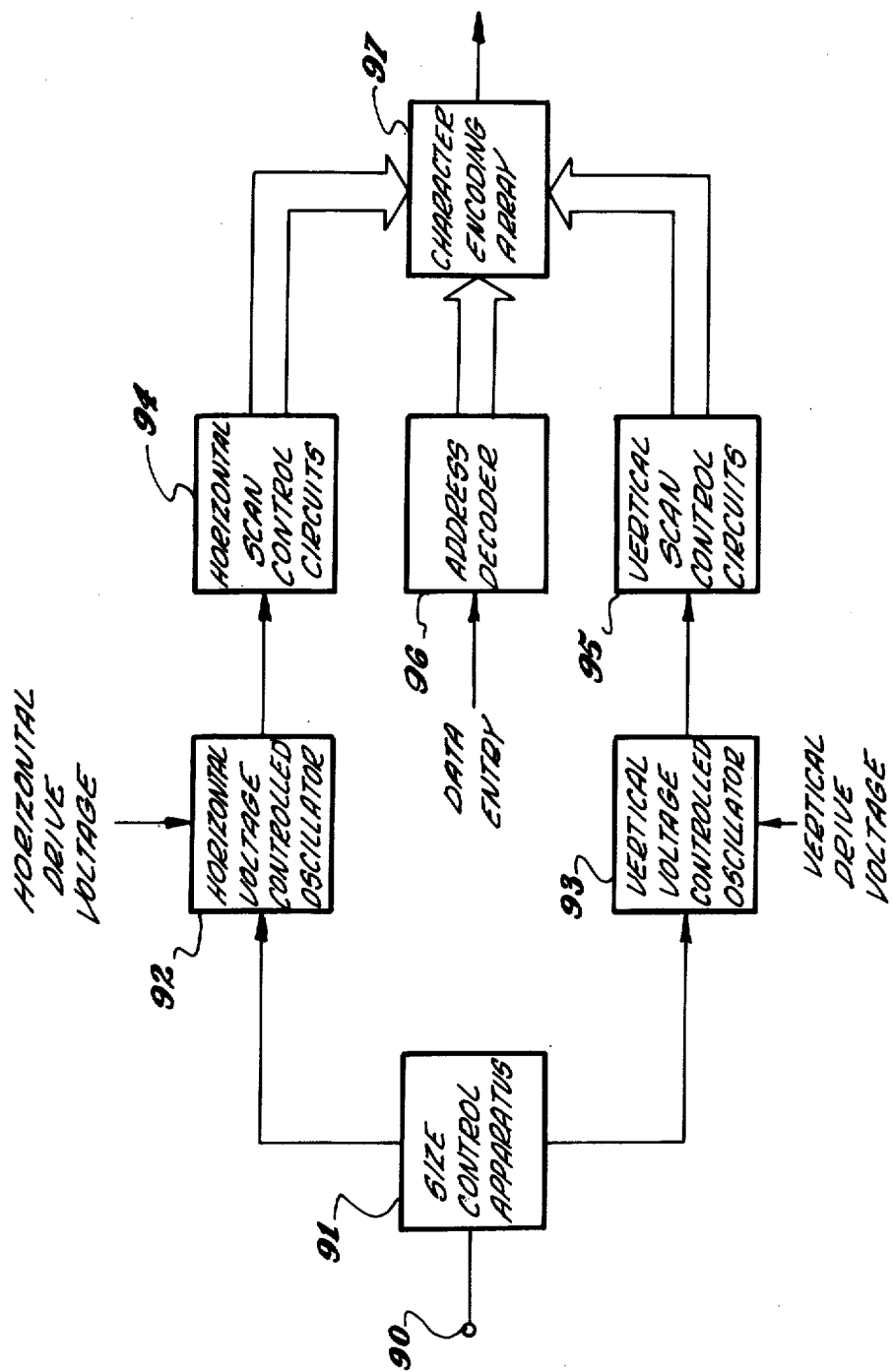
FIG. 1 is a block diagram of the apparatus controlling characters exhibited by a television receiver display unit.

Referring now to FIG. 1, a block diagram of the apparatus resulting in the generation of characters by the output of a television receiver is shown. Size control apparatus 99 is used to control the size of the displayed characters. A terminal 90 coupled to apparatus 91 can have a reset signal applied thereto and initiates exhibition of a character by a television receiver display unit. Output signals from size control apparatus 91 are applied to a horizontal voltage controlled oscillator 92 and to a vertical voltage control oscillator 93. A horizontal drive voltage is also applied to oscillator 92. An output signal of oscillator 92 is applied to horizontal scan control circuits 94 and an output signal of circuits 94 is applied to character encoding array 97. A vertical drive voltage is applied to oscillator 93.

The output signal of oscillator 93 is applied to vertical scan control circuits 95, and the output signals of circuits 95 is applied to character encoding array 97. Address decoder 96 receives entered data from data entry apparatus and applies the decoded signals to character encoding array 97. The output signal of array 97 is used to control the video output signal.

Figure 2:
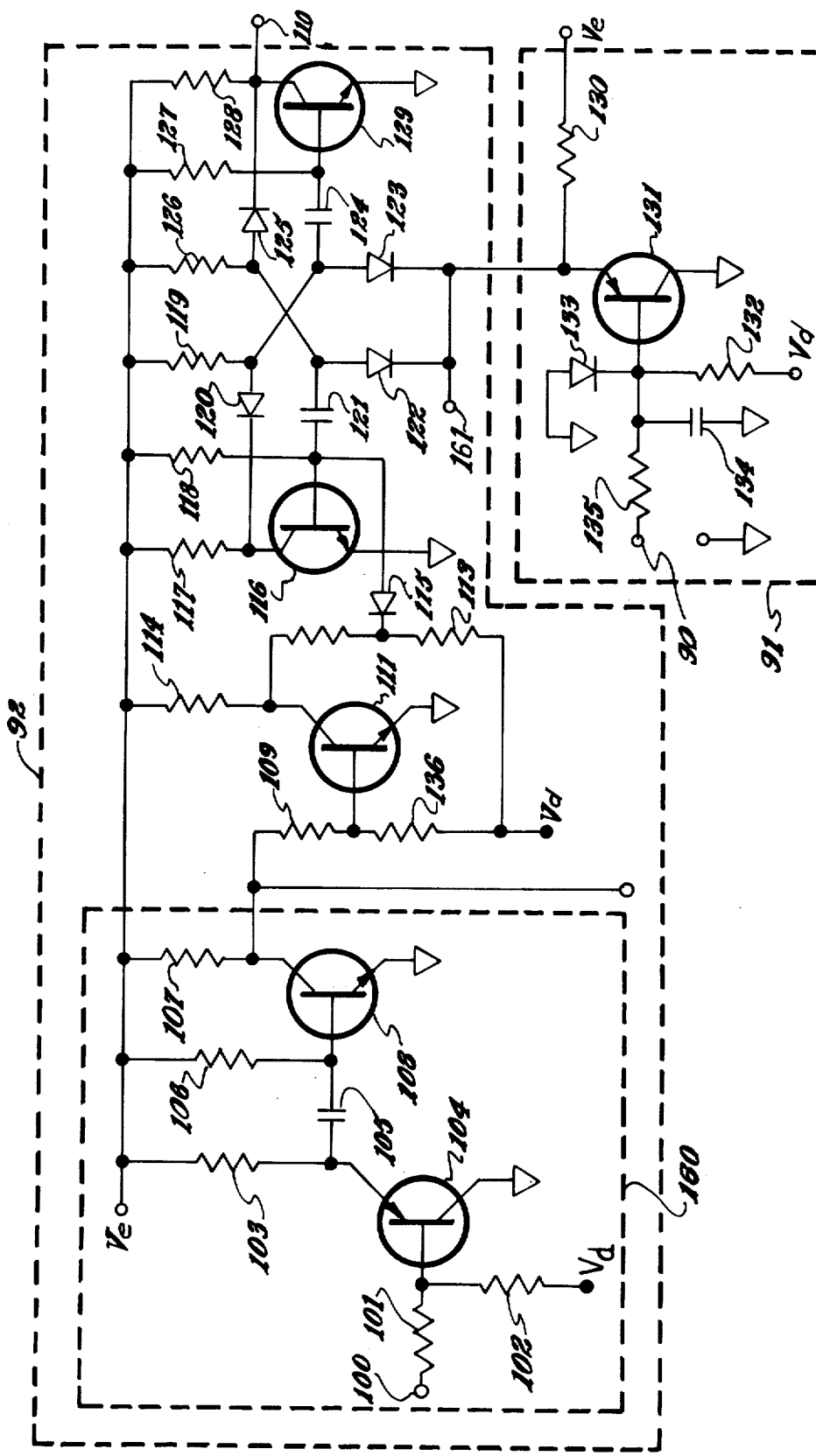
FIG. 2 is a schematic circuit diagram of size control apparatus and a voltage controlled relaxation oscillator according to the present invention.

Referring next to FIG. 2, the size control apparatus 91 and the horizontal oscillator 92 is shown. An input terminal 100 receives the horizontal drive voltage. Terminal 100 is coupled through resistor 101 to a base connection of pnp transistor 101. The base of transistor 101 is coupled through resistor 102 to voltage $V_d$. The emitter of transistor 104 is coupled through resistor 103 to voltage $V_e$ and through capacitor 105 to a base of transistor 108. The collector of transistor 104 and the emitter of 108 are coupled to a common terminal.

The base of transistor 108 is coupled through resistor 106 to voltage source $V_e$, while the collector of transistor 108 is coupled through resistor 107 to voltage source $V_e$ and through resistor 109 to a base of npn transistor 111. The base of transistor 111 is coupled through resistor 136 to voltage source $V_d$. The collector of transistor 111 is coupled through resistor 114 to voltage course $V_e$ and through resistor 112 to an anode of diode 115. The anode of diode 115 is also coupled through resistor 113 to voltage source $V_d$. The cathode of diode 115 is coupled to a base of pnp transistor 116.

The collector of transistor 116 is coupled through resistor 117 to voltage source $V_e$ and to an anode of diode 120. The base of transistor 116 is coupled through resistor 118 to voltage source $V_e$ and through capacitor 121 to an anode of diode 122. The anode of diode 122 is coupled to an anode of diode 125 and is coupled through resistor 126 to voltage source $V_e$. The anode of diode 120 is coupled through resistor 119 to voltage source $V_e$, to an anode of diode 123, and through capacitor 124 to the base of npn transistor 129. The base of transistor 129 is also coupled through resistor 127 to voltage source $V_e$ and the emitter of transistor 129 is coupled to a common terminal. The collector of transistor 129 is coupled to terminal 110, through resistor 128 to voltage source $V_e$ and to a cathode of diode 125.

The cathode of diode 122 and the cathode of diode 123 are coupled to terminal 160 and to an emitter of pnp transistor 131. The emitter of transistor 131 is coupled through resistor 130 to voltage source $V_e$. The collector of transistor 131 is coupled to the common terminal. The base of transistor 131 is coupled through resistor 132 to voltage source $V_d$, through resistor 135 to terminal 90, and through capacitor 134 to the common terminal. The base of transistor 131 is also coupled to the cathode of diode 133, the anode of which is coupled to the common terminal.

Figure 3:
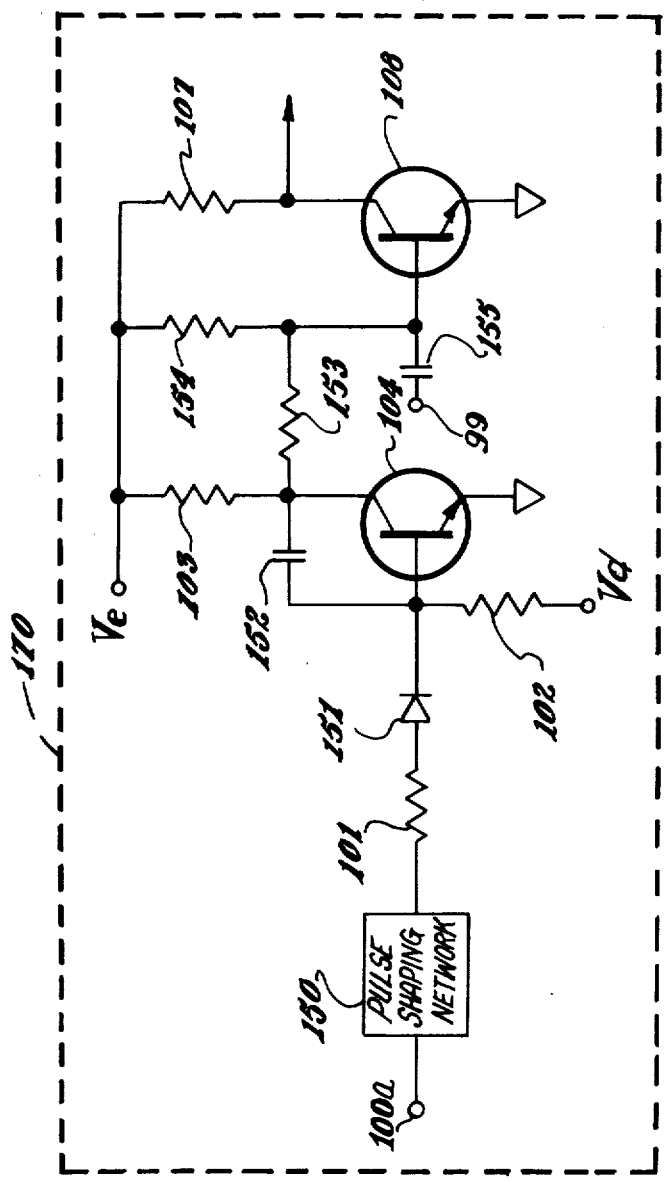
FIG. 3 is a circuit diagram of the apparatus which can be utilized with the voltage controlled oscillator to provide a cursive slant to displayed characters.

Referring next to FIG. 3, an input terminal 100 is coupled through pulse shaping network 150 to a first terminal of resistor 101. A second terminal of resistor 101 is coupled to an anode of diode 151. The cathode of diode 151 is coupled to a base of pnp transistor 104, through resistor 102 to a potential source $V_d$, and through capacitor 152 to a collector terminal of transistor 104. The collector of transistor 104 is also coupled through resistor 103 to potential source $V_e$ and through resistor 153 to the base connection of npn transistor 108. The base connection of transistor 108 is coupled to capacitor 155 to terminal 120 and through resistor 154 to voltage source $V_e$. The collector of transistor 108 is coupled through resistor 107 to voltage source $V_e$ and to an output terminal.

Figure 4:
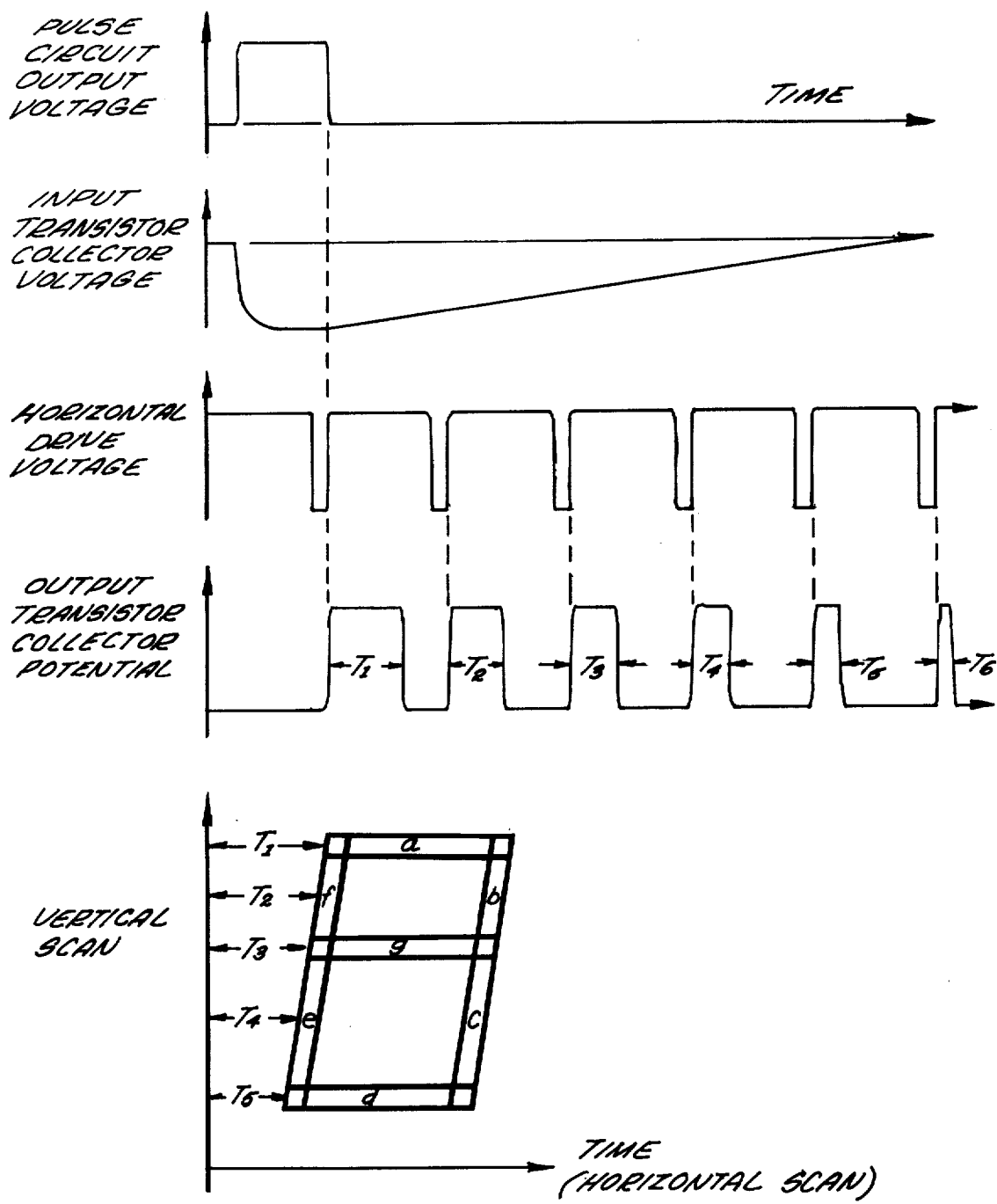
FIG. 4 is a timing diagram for idealized wave forms of the apparatus producing the character cursive slant.

Referring next to FIG. 4, idealized voltage wave forms of several signals of the circuit of FIG. 3, indicating the relative timing of the signal, are shown. The first wave form shows the pulse shaping circuit output voltage (i.e. element 150). The second wave form shows the collector potential of input transistor 104. The third wave form shows the input signal applied to terminal 120 from the horizontal drive circuit. The next wave form shows the collector potential of output transistor 108. The final figure is a schematic diagram of the manner in which the output voltage of transistor 108 is used in determining the delay of a segment on the display device of a television receiver. This figure also shows labels for the character segments which are utilized hereafter.

Figure 5:
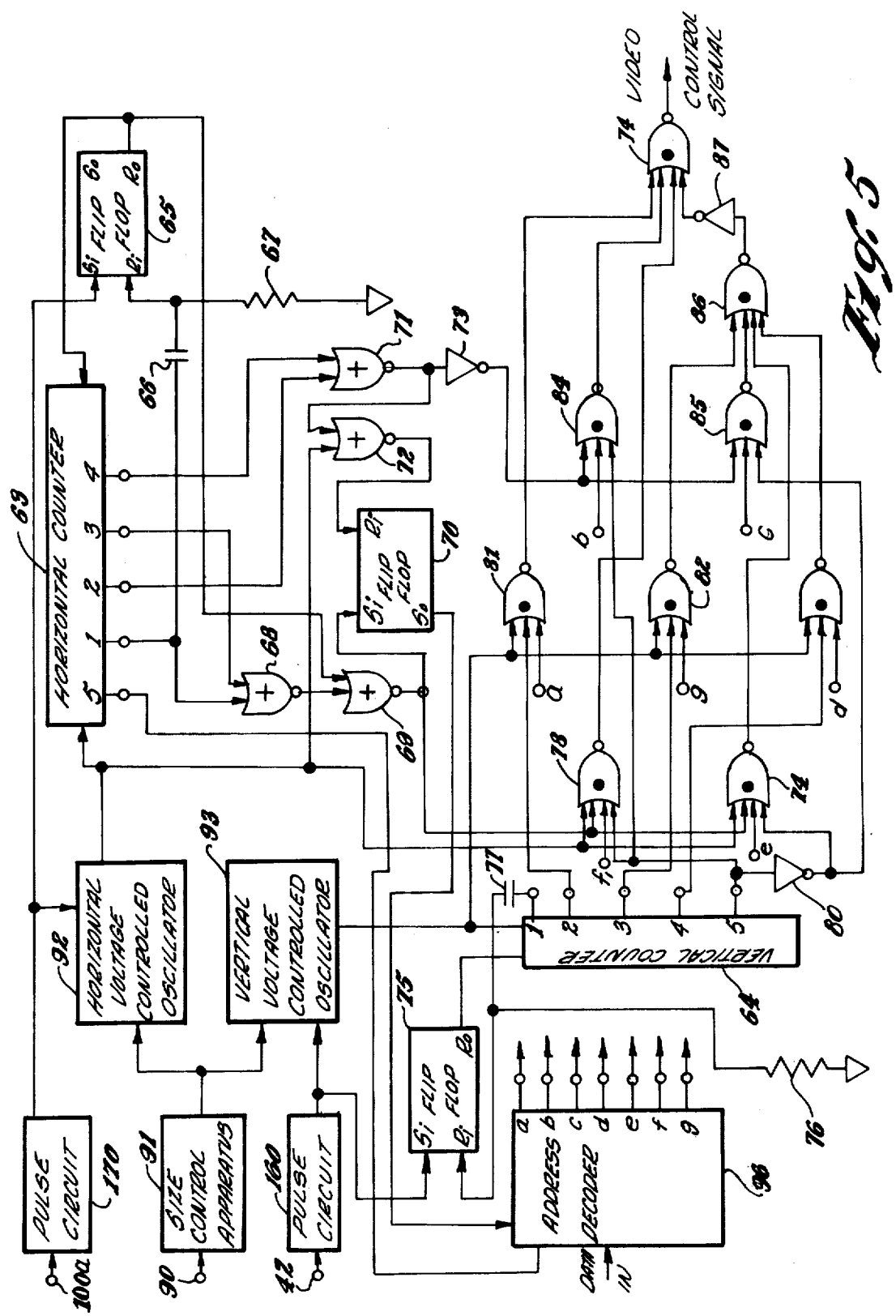
FIG. 5 is a circuit block diagram of the apparatus which enables exhibition of a selected character segment by the television receiver display unit.

Referring next to FIG. 5, the circuit for enabling the output signal of NAND gate 74 for exhibiting a visual output on the television receiver display unit is shown. Terminal 41 applies a signal to pulse network 170. The output signal of network 170 is applied to an input of horizontal voltage controlled oscillator 92 and to an Si input terminal of flip flop 65. An input terminal 90 is coupled to size control apparatus 91. The output signal from size control apparatus 91 is applied to horizontal voltage controlled oscillator 92 and to a vertical voltage controlled oscillator 93. An input terminal 94 is coupled to pulse network 160. Output terminal from pulse network 160 is coupled to vertical oscillator 93 and to an Si input terminal of flip flop 175.

The output signal of voltage controlled oscillator 92 is applied to an input terminal of horizontal counter 63, to one input terminal of logic NOR gate 72, to a first terminal of logic NAND gate 78 and to a first terminal of logic NAND gate 79. An Ro output terminal of flip flop 65 is coupled to an input terminal of horizontal counter 63 and to an input terminal of logic NOR gate 69. A first terminal of horizontal counter 63 is coupled to a first terminal of logic NOR gate 68 and through capacitor 66 to an Ri input terminal of flip flop 65. The Ri input terminal of flip flop 65 is coupled to resistor 67 to the common terminal. A second output terminal of counter 63 is coupled to a first input terminal of logic NOR gate 71. The third output terminal of horizontal counter 63 is coupled to a second terminal of logic NOR gate 68 while a fourth terminal of horizontal counter 63 is coupled to a second input terminal of NOR gate 71.

An output terminal of NOR gate 71 is coupled through an input terminal of inverting amplifier 73 and to a second terminal of NOR gate 72. An output terminal of NOR gate 72 is coupled to an input Ri terminal of flip flop 70.

An output terminal of NOR gate 68 is coupled to a first input terminal of NOR gate 69, while a second input terminal of NOR gate 69 is coupled to the output Ro terminal of flip flop 65. An output terminal of NOR gate 69 is coupled to an input terminal Si of flip flop 70, to a second input terminal of NAND gate 78, and to a second input terminal of NAND gate 79. A fifth output terminal of counter 63 is coupled to an input terminal of address decoder 96 and carries a horizontal carry signal. An output terminal So of flip flop 70 is coupled to an input terminal of address decoder 69 and carries a segment enable signal. Address decoder 69 is also adapted to receive the entered data which determines the segments to be exhibited by the television receiver display unit.

Voltage controlled oscillator 93 is coupled to an input terminal of vertical counter 64, a first input terminal of NAND gate 81, first input terminal of NAND gate 82, and a first input terminal of NAND gate 83. A first output terminal of counter 64 is coupled through capacitor 77 to an Ri input terminal of flip flop 75. The Ri input terminal of flip flop 75 is also coupled through resistor 76 to the common terminal. The output terminal Ro of flip flop 75 is coupled to a second input terminal of vertical counter 64.

A second terminal of counter 64 is coupled to a second input terminal of NAND gate 81. A third output terminal of counter 64 is coupled to a second input terminal of NAND gate 82. A fourth output terminal of counter 64 is coupled to a second input terminal of NAND gate 83. A fifth output terminal of counter 64 is coupled to a third input terminal of NAND gate 78 and to a second input terminal of NAND gate 84, and to an input terminal of inverting amplifier 80. An output terminal of amplifier 80 is coupled to a third input terminal of NAND gate 79 and to a second input terminal of NAND gate 85.

An output terminal of inverting amplifier 73 is coupled to a first input terminal of NAND gate 84 and to a first input terminal of NAND gate 85.

An output terminal $a$ of address decoder 96 is coupled to a third input terminal of NAND gate 81, an output terminal $b$ of address decoder 96 is coupled to a third input terminal of NAND gate 84. An output terminal $c$ of address decoder 96 is coupled to a third input terminal of NAND gate 85. A $d$ output terminal of address decoder 96 is coupled to a third input terminal of NAND gate 83 and an $e$ output terminal of address decoder 96 is coupled to a fourth input terminal of NAND gate 79. An $f$ output terminal of address decoder 96 is coupled to a fourth input terminal of NAND gate 78. And a $g$ output terminal of address decoder 96 is coupled to a third input terminal of NAND gate 82.

An output terminal of NAND gate 81 is coupled to a first input terminal of NAND gate 74. An output terminal of NAND gate 78 is coupled to a second input terminal of NAND gate 74, and an output terminal $d$ of NAND gate 84 is coupled to a third input terminal of NAND gate 74. And a fourth input terminal of NAND gate 74 is coupled to an output terminal of inverting amplifier 87. An output terminal of NAND gate 82 is coupled to a first input terminal of NAND gate 86, an output terminal of NAND gate 85 is coupled to a second input terminal of NAND gate 86, and output terminal of NAND gate 79 is coupled to a third input terminal of NAND gate 86, and an output terminal of NAND gate 83 is coupled to a fourth input terminal of NAND gate 86. An output terminal of NAND gate 86 is coupled to an input terminal of inverting amplifier 87.

Figure 6:
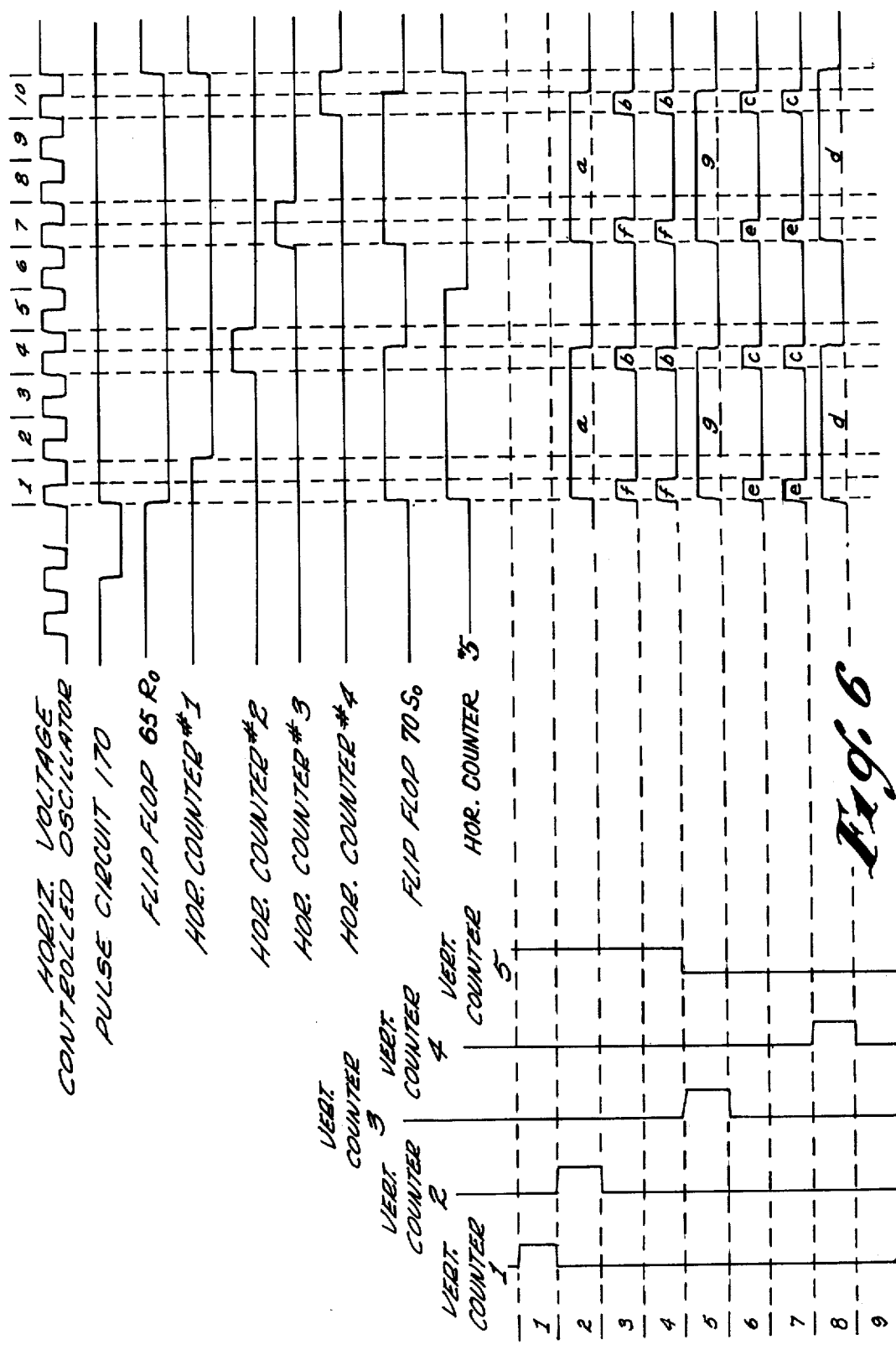
FIG. 6 shows the idealized wave forms for several signals of the apparatus providing the generation of selected character segments.

Referring next to FIG. 6, the idealized wave forms of several signals of FIG. 5 are shown. The horizontal voltage controlled oscillator provides the timing clock for enabling various positions of the television receiver display along the horizontal position. Pulse network 170 provides the initial timing pulse for the horizontal controlled oscillator. The Ro output of flip flop 65 enables the video output signal from NAND gate 74 during the entire cycle. Horizontal counter output terminals 1, 2, 3, 4, and 5 are shown receiving displayed wave forms for enabling horizontal character segment regions. The remaining wave form is the So output terminal of flip flop 70.

Positioned along the vertical direction is the vertical voltage controlled oscillator output shown as a series of pulses. The wave forms of the vertical counter output terminals 1, 2, 3, 4, and 5 are shown in the succeeding diagrams. These wave forms enable character segments along a vertical direction. The intersection of the grids shows the segments that are enabled by the presence of the wave forms. The labelling of the enabled wave forms corresponds with the letters of FIG. 5 as well as the letters of FIG. 4 in which all the character segments are shown.

OPERATION OF THE PREFERRED EMBODIMENT

The group of elements labelled 91 in FIG. 2 contains the apparatus used to control the size of the displayed characters. In typical operation, the output pulse 90 sets a voltage level at the output emitter terminal of transistor 131. After the output signal is removed from terminal 90, the charge of capacitor 134 discharges gradually lowering the voltage at the emitter terminal of transistor 131. The emitter terminal 131, in addition to being coupled to oscillator 92, is coupled through terminal 160 to oscillator 93.

The group of elements not included in the section labelled 160 and not included in the section labelled 91 of FIG. 2 comprise a relaxation oscillator. The period of time of the output pulses of this oscillator, occurring at terminal 110, depends on the voltage at the emitter terminal of transistor 131. As the voltage across the emitter terminal of transistor 131 is lowered, the result is to increase the rapidity with which the oscillations occur in the relaxation oscillator. This increases in the rapidity of the relaxation oscillators is equivalent to speeding up a clocking mechanism so that the character exhibited on a television display apparatus appears to diminish. In the Preferred Embodiment, the displayed characters appear to diminish in size until their disappearance. It will be clear to those skilled in the art that a controlled potential applied to terminal 90 can be used to program the size of the displayed characters. The group of elements labelled 160 of FIG. 2 includes a pulse shaping device for synchronizing the relaxation oscillator 92 with the signal during the horizontal flyback of the receiver display apparatus. The elements labelled 92 are generally reproduced in the vertical voltage controlled oscillator 93.

Referring next to FIG. 3, the group of elements labelled 160 in FIG. 2 are replaced with the horizontal voltage controlled oscillator are the group of elements labelled 170. Instead of the pulse shaping network of elements 160, the elements 170 provide a sweep circuit charging capacitor 152. This sweep circuit causes the duration of pulses occurring at the collector of transistor 108 to vary in duration during the period that capacitor 152 is charging. This variation in the output pulses is used to provide a cursive slant in the character in the preferred embodiment. The use of the variable length pulses to provide a cursive slant is illustrated in FIG. 4. Referring now to FIG. 5, the apparatus for enabling a particular segment of the generated character is shown. Basically three events must take place for the character segment to be generated. The horizontal counter must be enabled by clocking apparatus provided by oscillator 92. The vertical counter must currently be enabled by clocking apparatus provided by oscillator 93. And concurrent with enabling signals from the horizontal oscillator and the vertical oscillator, there must occur an enabling signal from address decoder 96. Address decoder is used to convert the data entered in the television receiver into the format specified by the availability of character segments. Thus when the vertical and horizontal oscillator circuits are active, all possible segments are generated. The output signals from the address decoder enable only those segments utilizing the character to be exhibited by the receiver display unit.

What is claimed is:

1. Apparatus for displaying a character indicative of a selected television channel on the screen of a television receiver comprising:
   a character generator having a first controllable oscillator and a second controllable oscillator, the frequency of said first controllable oscillator determining the horizontal size of a displayed character and the frequency of the second controllable oscillator determining the vertical size of a displayed character;
   means for controlling the frequency of said first controllable oscillator and the frequency of said second controllable oscillator for causing said oscillators to operate at respective initial frequencies for a predetermined time, and at respective increasing frequencies after the predetermined time to cause a character to be displayed for the predetermined time at an initial size, and after the predetermined time to decrease in size, eventually disappearing.

2. A character generator for use with the display unit of a television receiver comprising:
   a first controllable oscillator;
   a first pulse network connected to the horizontal drive circuit of said receiver for providing an initializing pulse to said first controllable oscillator;
   a second controllable oscillator;
   a second pulse network connected to the vertical drive circuit of said receiver for providing an initializing pulse to said second controllable oscillator;
   means for defining an overlap of signals from said first oscillator and said second oscillator, the overlap of said first and second oscillator signals determining a plurality of segments;
   segment control means for providing a video control signal to said display unit whereby selected segments forming a character are displayed;
   means for controlling the frequency of said first oscillator and the frequency of said second oscillator; and wherein the frequency of said first oscillator determines the horizontal size of said displayed character and the frequency of said second oscillator determines the vertical size of said displayed character.

3. The invention of claim 2 wherein said frequency controlling means causes said first controllable oscillator to operate at a first initial frequency and said second controllable oscillator to operate at a second initial frequency, and after a predetermined time causes said first and second oscillator frequencies to increase, causing the displayed character to decrease in size.

* * * * *